(12) United States Patent
Isogai (10) Patent No.: US 8,904,222 B2
(45) Date of Patent: Dec. 2, 2014

(54) WATCHDOG TIMER AND CONTROL METHOD THEREFOR

(75) Inventor: Hideo Isogai, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 779 days.

(21) Appl. No.: 12/656,727

(22) Filed: Feb. 16, 2010

(65) Prior Publication Data

US 2010/0211813 A1     Aug. 19, 2010

(30) Foreign Application Priority Data

Feb. 17, 2009   (JP) .................................. 34299/2009

(51) Int. Cl.
   *G06F 1/14*   (2006.01)
   *G06F 11/07*   (2006.01)

(52) U.S. Cl.
   CPC .................................. *G06F 11/0757* (2013.01)
   USPC ...................................................... 713/502

(58) Field of Classification Search
   USPC ...................................................... 713/502
   See application file for complete search history.

(56) References Cited

U.S. PATENT DOCUMENTS 5,408,645 A * 4/1995 Ikeda et al. .................... 714/55
6,959,404 B2 * 10/2005 Hirakawa et al. ............... 714/55
7,228,463 B2 * 6/2007 Giraud ........................... 714/55

FOREIGN PATENT DOCUMENTS

JP        2003-67221        3/2003

* cited by examiner

*Primary Examiner* — Thomas Lee
*Assistant Examiner* — Eric Chang
(74) *Attorney, Agent, or Firm* — McGinn IP Law Group, PLLC (57) ABSTRACT

A watchdog timer includes an execution address detection section comparing a value of a program counter of a central processing unit with an address of a predetermined area, a timer count section having a first overflow time set thereto when the execution address detection section indicates that the value of the program counter has entered the predetermined area, and a counter clear control section generating a request signal for clearing the timer count section when the execution address detection section indicates that the value of the program counter has exited from the predetermined area.

17 Claims, 7 Drawing Sheets

WATCHDOG TIMER AND CONTROL METHOD THEREFOR

INCORPORATION BY REFERENCE

This application is based upon and claims the benefit of priority from Japanese Patent Application No. 2009-034299 which was filed on Feb. 17, 2009, the disclosure of which is incorporated herein in its entirety by reference.

BACKGROUND OF THE INVENTION

1. Field of the Invention

The present invention relates to a watchdog timer and a control method therefor, and more particularly, to a technology of setting an overflow time to a watchdog timer used for a microcontroller.

2. Description of Related Art

In a microcontroller (microcomputer) or the like, a watchdog timer is generally used in order to detect runaway upon execution of the program (the program becomes trapped in loops with no controlled exit). With regard to such a watchdog timer as described above, JP 2003-67221 A describes a control circuit for a watchdog timer that is capable of reliably detecting runaway occurring in a microcontroller even in a case where there exist a plurality of events having different optimal timer initialization permission periods set therefor. With such a control circuit as described above, even in a case where the microcontroller executes a plurality of events having different lengths of processing time set therefor, runaway occurring in the microcontroller may be reliably detected by selecting an optimal initialization permission period of the watchdog timer depending on the event executed by the microcontroller, to thereby improve the reliability of the microcontroller. In such a watchdog timer as described above, the overflow time is set to have a constant value, such as a value falling within a range of from several tens of milliseconds to several hundreds of milliseconds in general.

SUMMARY

However, the following analysis is given according to the present invention. Namely, in an embedded microcontroller, for example, the routine of writing and erasing with respect to a flash memory is provided to a user together with the microcontroller, and is incorporated in the routine of the user. The overflow time of the watchdog timer is set to have a value falling within a range of from several tens of milliseconds to several hundreds of milliseconds for a normal routine, whereas for the routine of writing and erasing with respect to the flash memory, the length of processing time increases and hence the overflow time needs to be set to have a value of, for example, several seconds or longer. Accordingly, when the overflow time is kept to the value falling within the range of from several tens of milliseconds to several hundreds of milliseconds, which is the value set by the user, overflow of the watchdog timer may occur during the routine of writing and erasing with respect to the flash memory, resulting in inappropriate writing and erasing with respect to the flash memory. Thus, in a case where such a special routine as writing and erasing with respect to the flash memory is to be provided without affecting the routine of the user, the special routine may not be incorporated unless the setting of the overflow time is changed on the user side.

The present invention seeks to solve one or more of the above problems, or to improve upon those problems at least in part.

In one exemplary embodiment, a watchdog timer includes an execution address detection section for comparing a value of a program counter of a central processing unit with an address of a predetermined area, a timer count section having a first overflow time set thereto when the execution address detection section indicates that the value of the program counter has entered the predetermined area, and a counter clear control section for generating a request signal for clearing the timer count section when the execution address detection section indicates that the value of the program counter has exited from the predetermined area.

In another exemplary embodiment, a control method for a watchdog timer includes comparing a value of a program counter of a central processing unit with an address of a predetermined area, setting a first overflow time to a timer count section when a result of the comparing indicates that the value of the program counter has entered the predetermined area, and generating a request signal for clearing the timer count section when the result of the comparing indicates that the value of the program counter has exited from the predetermined area.

According to the present invention, the overflow time to be set with respect to a program associated with the address of the predetermined area may be set regardless of the overflow time set with respect to another area. Accordingly, the routine associated with the predetermined area may be incorporated without affecting the setting of the overflow time with respect to the routine on the user side.

BRIEF DESCRIPTION OF THE DRAWINGS

The above and other purposes, advantages and features of the present invention will become more apparent from the following description of a certain exemplary embodiment taken in conjunction with the accompanying drawings in which.

DETAILED DESCRIPTION OF THE EXEMPLARY EMBODIMENTS

The invention will now be described herein with reference to an illustrative exemplary embodiment. Those skilled in the art will recognize that many alternative embodiments can be accomplished using the knowledge of the present invention, and that the invention is not limited to the exemplary embodiment illustrated for explanatory purposes.

First Exemplary Embodiment

A watchdog timer (denoted by reference numeral 10 of FIG. 1) according to a first exemplary embodiment of the present invention includes an execution address detection section (denoted by reference numeral 12 of FIG. 1) for comparing a value of a program counter (denoted by reference numeral 20 of FIG. 1) of a central processing unit (CPU: denoted by reference numeral 30 of FIG. 1) with an address of a predetermined area, a timer count section (denoted by reference numeral 15 of FIG. 1) having a first overflow time set thereto when the execution address detection section indicates that the value of the program counter has entered the predetermined area, and a counter clear control section (denoted by reference numeral 14 of FIG. 1) for generating a request signal for clearing the timer count section when the execution address detection section indicates that the value of the program counter has exited from the predetermined area.

The first overflow time may be preferably longer than an execution time required when the central processing unit executes a program in the predetermined area.

The watchdog timer may further include an overflow time setting section (denoted by reference numeral 13 of FIG. 1) for setting an overflow time with respect to the timer count section, and the overflow time setting section may preferably set a second overflow time which is shorter than the first overflow time, when the execution address detection section indicates that the value of the program counter is out of the predetermined area.

The watchdog timer may further include a setting permission register (denoted by reference numeral 11 of FIG. 1) for permitting the first overflow time to be set. By setting the setting permission register to an inhibition state, the overflow time of the timer count section may be set as the second overflow time regardless of whether or not the value of the program counter falls within the predetermined area.

With the watchdog timer as described above, the first overflow time to be set with respect to the program associated with the address of the predetermined area may be set regardless of the second overflow time set with respect to the another area. Accordingly, the routine associated with the predetermined area may be incorporated without affecting the setting of the overflow time with respect to the routine on the user side, which exists in the another area.

Hereinafter, detailed description is given with reference to the accompanying drawings.

Figure 1:
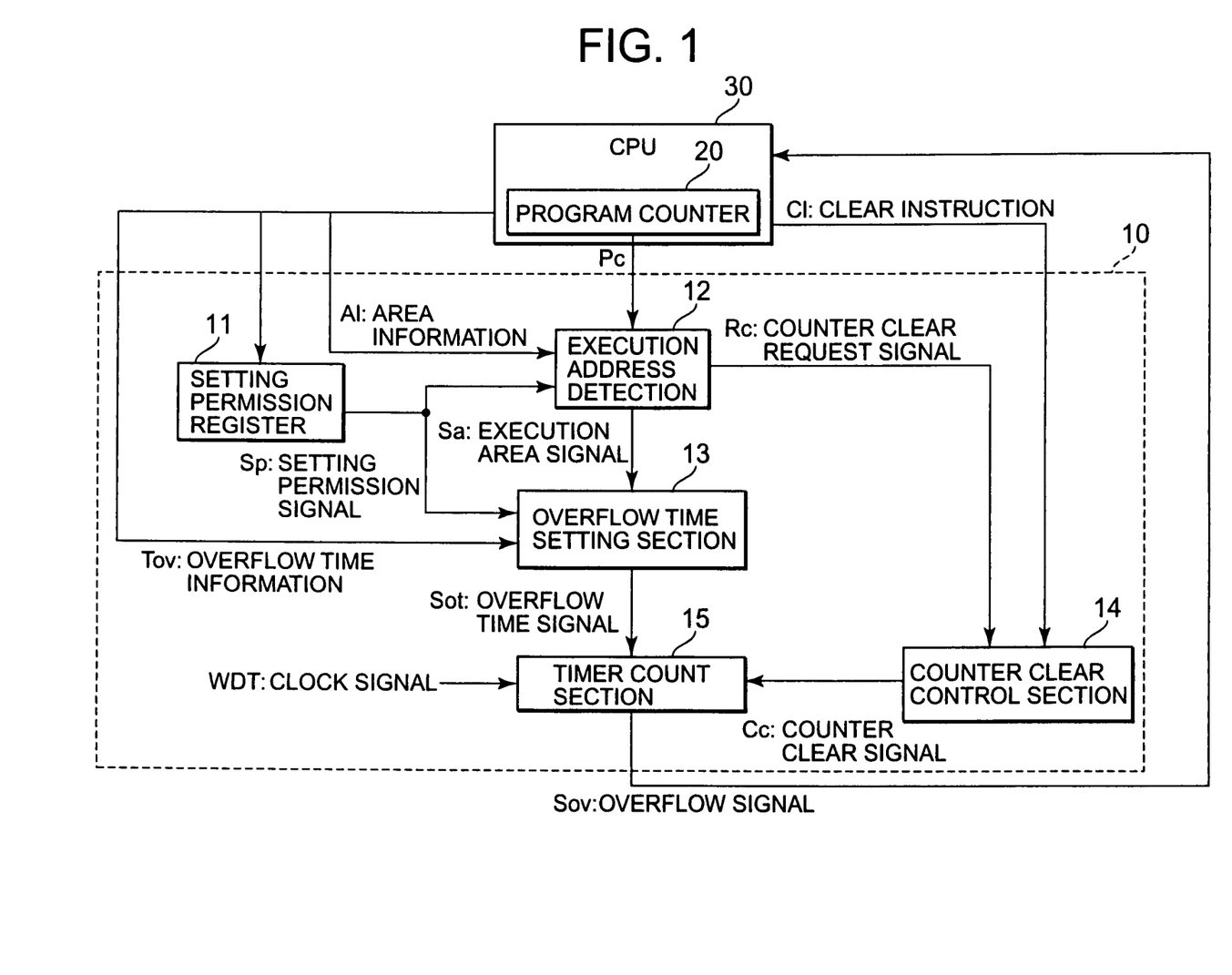
FIG. 1 is a block diagram illustrating a configuration of a watchdog timer according to a first exemplary embodiment of the present invention.

FIG. 1 is a block diagram illustrating a configuration of a watchdog timer according to the first exemplary embodiment of the present invention. In FIG. 1, the watchdog timer 10 includes the setting permission register 11, the execution address detection section 12, the overflow time setting section 13, the counter clear control section 14, and the timer count section 15.

In the setting permission register 11, the CPU 30 sets information as to whether or not to set a specific area overflow time to the timer count section 15 in a case where a value Pc of a program counter 20 falls within a specific area. When the specific area overflow time is set to the timer count section 15, the setting permission register 11 outputs a setting permission signal Sp as an active signal to each of the execution address detection section 12 and the overflow time setting section 13.

The execution address detection section 12 receives from the CPU 30 inputs of area information Ai indicating a specific area start address and a specific area end address, and the value Pc of the program counter 20. Then, when the value Pc of the program counter 20 falls within the specific area, the execution address detection section 12 outputs an execution area signal Sa as an active signal to the overflow time setting section 13. Alternatively, in a state in which the setting permission signal Sp is an active signal, when the value Pc of the program counter 20 has entered the specific area or when the value Pc of the program counter 20 has exited from the specific area, the execution address detection section 12 outputs a counter clear request signal Rc as an active signal to the counter clear control section 14.

In the overflow time setting section 13, the CPU 30 sets overflow time information Toy indicating a general area overflow time and the specific area overflow time. When the execution area signal Sa and the setting permission signal Sp are both active signals, the overflow time setting section 13 outputs an overflow time signal Sot which indicates the specific area overflow time, to the timer count section 15. When at least one of the execution area signal Sa and the setting permission signal Sp is not an active signal, the overflow time setting section 13 outputs an overflow time signal Sot which indicates the general area overflow time, to the timer count section 15.

When a clear instruction Cl is input from the CPU 30 or when the counter clear request signal Rc is input from the execution address detection section 12, the counter clear control section 14 outputs a counter clear signal Cc to the timer count section 15.

After the timer count section 15 has been cleared due to the counter clear signal Cc, the timer count section 15 counts the number of pulses of a clock signal WDT for the watchdog timer, and when the count value has reached a value corresponding to the overflow time indicated by the overflow time signal Sot, the timer count section 15 outputs an overflow signal Sov to the CPU 30.

The CPU 30 generates an interrupt or the like based on the overflow signal Sov, and performs processing such as reset processing for handling runaway of the running program.

Figure 2:
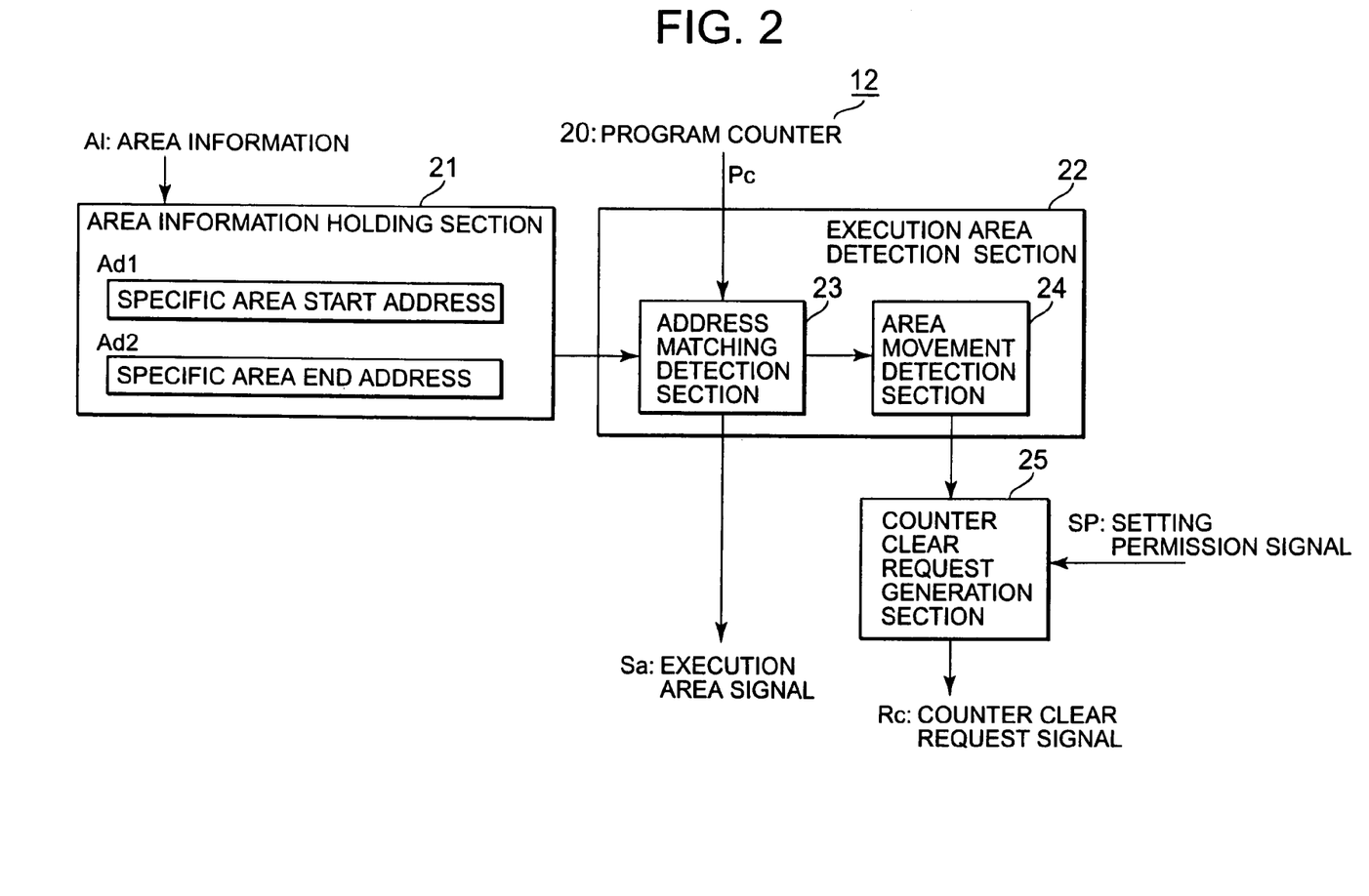
FIG. 2 is a block diagram illustrating a configuration of an execution address detection section.
Figure 3:
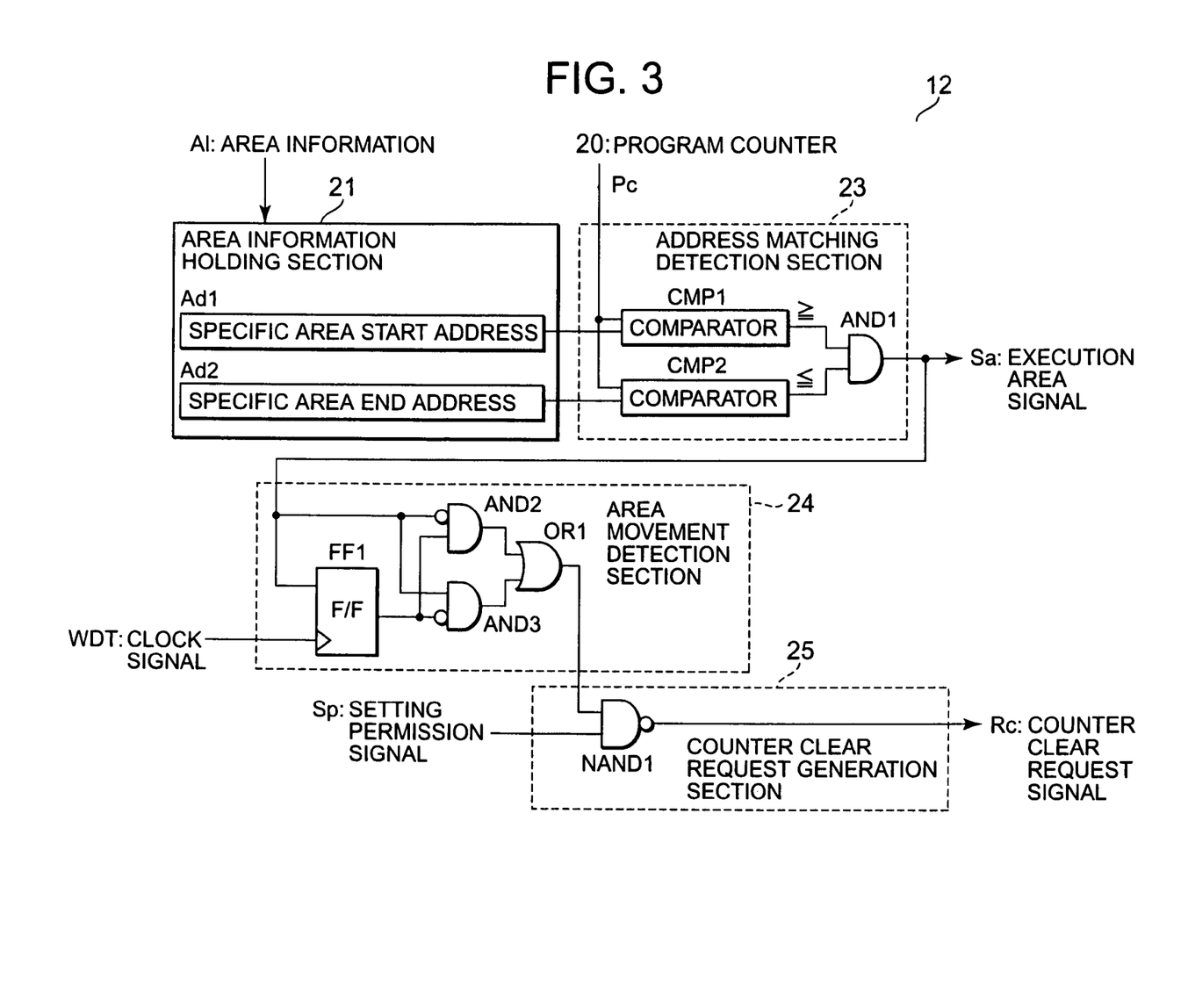
FIG. 3 is a diagram illustrating a detailed configuration of the execution address detection section.

Next, description is given of details of the execution address detection section 12. FIG. 2 is a block diagram illustrating a configuration of the execution address detection section 12. Further, FIG. 3 is a diagram illustrating a detailed configuration of the execution address detection section 12. In FIGS. 2 and 3, the execution address detection section 12 includes an area information holding section 21, an execution area detection section 22, and a counter clear request generation section 25. The execution area detection section 22 includes an address matching detection section 23 and an area movement detection section 24.

The area information holding section 21 holds a specific area start address Ad1 and a specific area end address Ad2 that are output from the CPU 30 as the area information Ai.

The address matching detection section 23 includes comparators CMP1 and CMP2, and an AND circuit AND1. The comparator CMP1 compares the value Pc of the program counter 20 with the specific area start address Ad1, and when Pc≥Ad1, the comparator CMP1 outputs a High-level signal to one input terminal of the AND circuit AND1. The comparator CMP2 compares the value Pc of the program counter 20 with the specific area end address Ad2, and when Pc≤Ad2, the comparator CMP2 outputs a High-level signal to another input terminal of the AND circuit AND1. When Ad1≤Pc≤Ad2, the AND circuit AND1 outputs the execution area signal Sa as an active signal (High-level signal) to each of the overflow time setting section 13 and the area movement detection section 24. In other words, the address matching detection section 23 detects whether or not the value Pc of the program counter 20 falls within the range between the specific area start address Ad1 and the specific area end address Ad2, and when the value Pc of the program counter 20 falls within the range, that is, within the specific area, the address matching detection section 23 outputs the execution area signal Sa as an active signal to each of the overflow time setting section 13 and the area movement detection section 24.

The area movement detection section 24 includes a flip-flop circuit FF1, AND circuits AND2 and AND3, and an OR circuit OR1. The flip-flop circuit FF1 latches the execution area signal Sa based on the clock signal WDT, and outputs the latched execution area signal Sa to one input terminal of the AND circuit AND2. Further, the flip-flop circuit FF1 logically inverts its output signal, and outputs the NOT signal to one input terminal of the AND circuit AND3. The AND circuit AND2 receives an input of the NOT signal of the execution area signal Sa at another input terminal thereof, and outputs the resultant signal to one input terminal of the OR circuit OR1. The AND circuit AND3 receives an input of the execution area signal Sa at another input terminal thereof, and outputs the resultant signal to another input terminal of the OR circuit OR1. The OR circuit OR1 outputs its output signal to the counter clear request generation section 25. In other words, the area movement detection section 24 detects that the execution area signal Sa has changed its state from an inactive state to an active state or from an active state to an inactive state, that is, the area movement detection section 24 detects that the value Pc of the program counter 20 has entered the specific area or has exited from the specific area, and outputs its output signal to the counter clear request generation section 25.

The counter clear request generation section 25 includes a NAND circuit NAND1. The NAND circuit NAND1 receives an input of the output signal from the OR circuit OR1 at one input terminal thereof, and receives an input of the setting permission signal Sp at another input terminal thereof, to thereby output the resultant signal as the counter clear request signal Rc. In other words, in the state in which the setting permission signal Sp is an active signal, when the value Pc of the program counter 20 has entered the specific area or when the value Pc of the program counter 20 has exited from the specific area, the counter clear request generation section 25 outputs the counter clear request signal Rc as an active signal (Low-level signal) to the counter clear control section 14.

Figure 4:
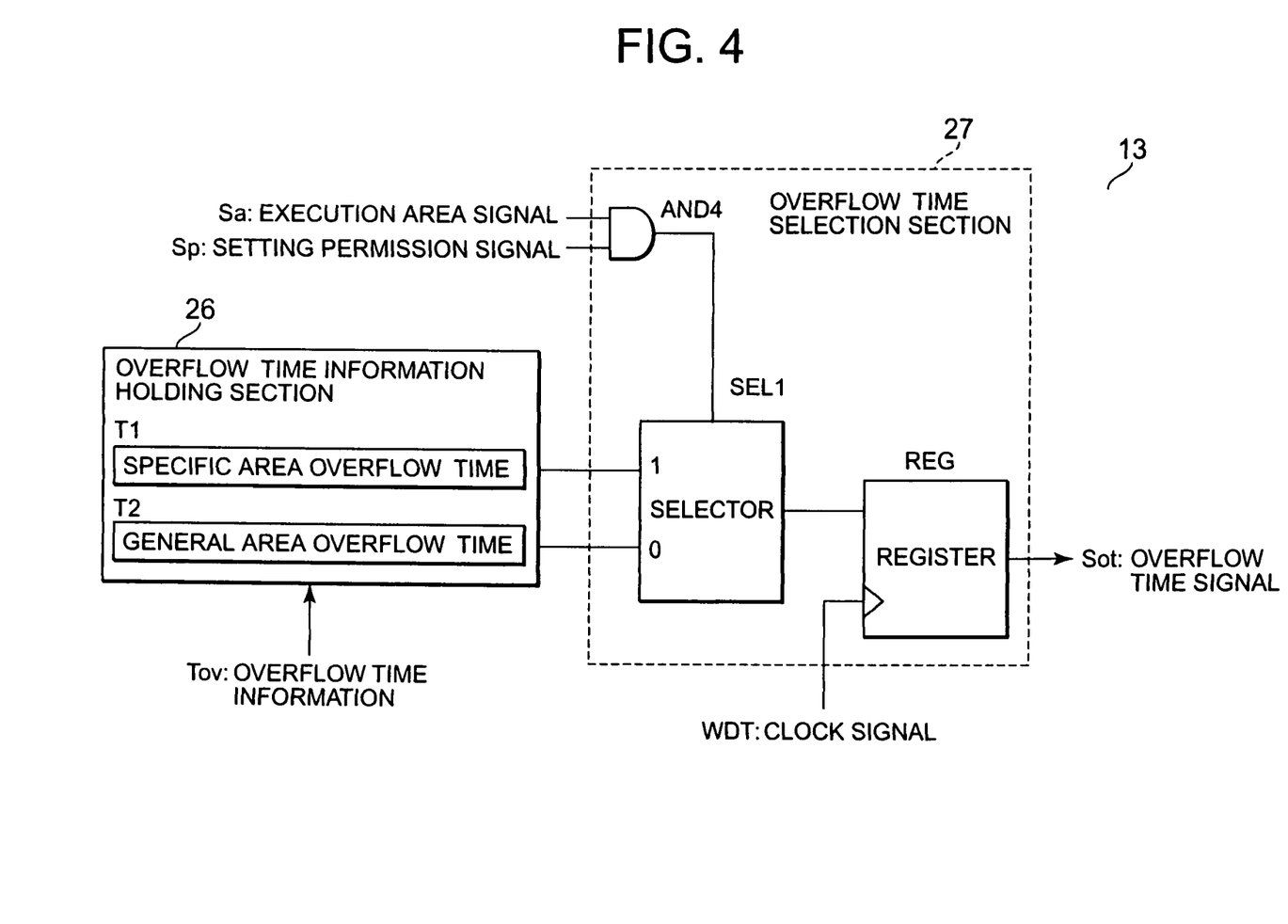
FIG. 4 is a diagram illustrating a detailed configuration, of an overflow time setting section.

Next, description is given of details of the overflow time setting section 13. FIG. 4 is a diagram illustrating a detailed configuration of the overflow time setting section 13. In FIG. 4, the overflow time setting section 13 includes an overflow time information holding section 26 and an overflow time selection section 27.

The overflow time information holding section 26 holds a specific area overflow time T1 and a general area overflow time T2 that are indicated by the overflow time information Tov output from the CPU 30. For example, the general area overflow time T2 is set to have a value falling within the range of from several tens of milliseconds to several hundreds of milliseconds. The specific area overflow time T1 is longer than the general area overflow time T2, and is set to have a value of, for example, several seconds.

The overflow time selection section 27 includes an AND circuit AND4, a selector SEL1, and a register REG. The AND circuit AND4 receives an input of the execution area signal Sa at one input terminal thereof, and receives an input of the setting permission signal Sp at another input terminal thereof, to thereby output the resultant signal as a selector signal for the selector SEL1. When the execution area signal Sa and the setting permission signal Sp are both active signals (High-level signals), the selector SEL1 selects the specific area overflow time T1. When at least one of the execution area signal Sa and the setting permission signal Sp is an inactive signal (Low-level signal), the selector SEL1 selects the general area overflow time T2. Then, a signal indicating the selected one of the specific area overflow time T1 and the general area overflow time T2 is output to the register REG.

The register REG latches the output signal from the selector SEL1 based on the clock signal WDT, and outputs the latched signal as the overflow time signal Sot.

Figure 5:
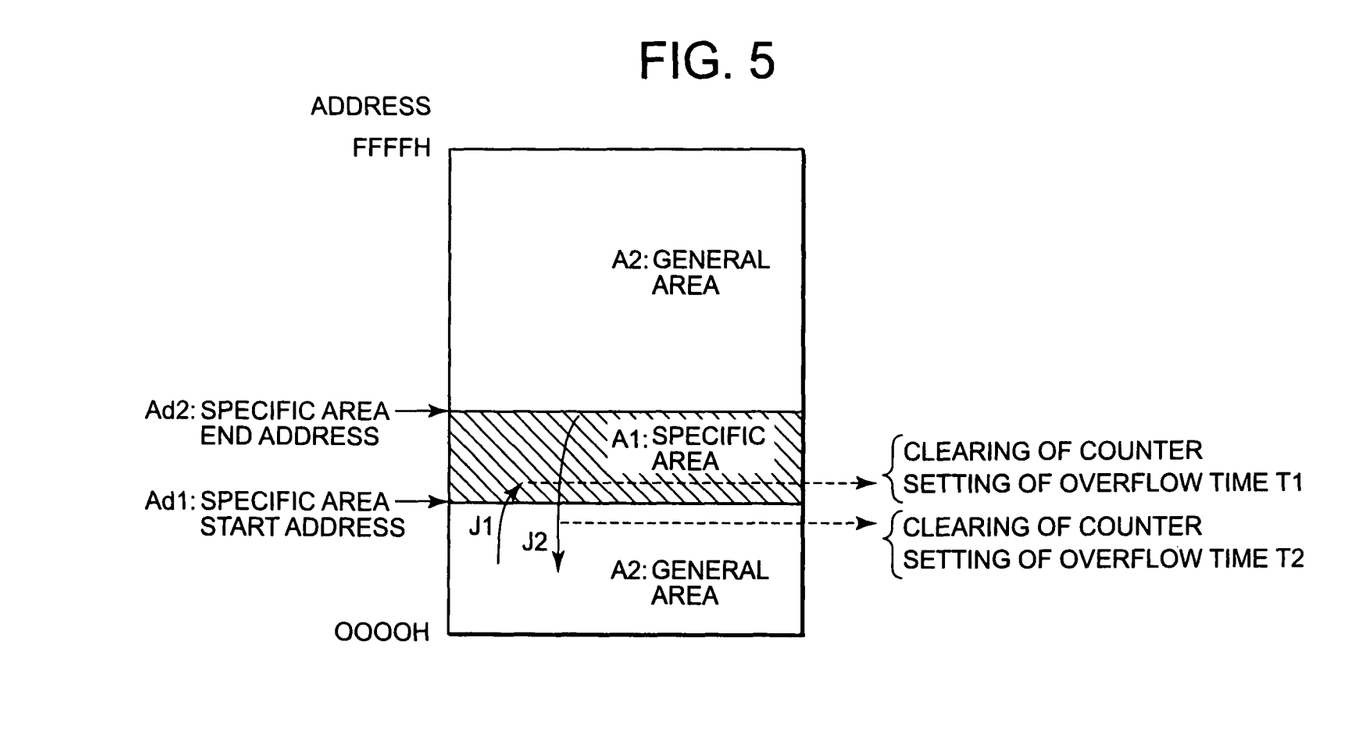
FIG. 5 is a diagram schematically illustrating an operation regarding setting of the watchdog timer in an address space of a CPU.

Next, description is given of an operation of the CPU 30. FIG. 5 is a diagram schematically illustrating an operation of setting the watchdog timer 10 in an address space of the CPU 30. In FIG. 5, in a case where a program needs to be executed in a specific area A1 while another program is being executed in a general area A2, the CPU 30 provides, for example, a jump instruction or a subroutine call instruction, to thereby move the value Pc of the program counter 20 as indicated by J1. On this occasion, with the event that the value Pc of the program counter 20 has entered the specific area A1 as a trigger, the watchdog timer 10 clears the timer count section 15, and sets the specific area overflow time T1 to the timer count section 15. In this case, the specific area overflow time T1 is set to be longer than an execution time for the program (routine) in the specific area A1. After that, the CPU 30 executes the program in the specific area A1. At the same time, the timer count section 15 counts the clock signal WDT.

In a case where the CPU 30 has finished the execution of the program in the specific area A1, the CPU 30 provides, for example, a jump instruction or a return instruction, to thereby move the value Pc of the program counter 20 as indicated by J2. On this occasion, with the event that the value Pc of the program counter 20 has exited from the specific area A1 as a trigger, the watchdog timer 10 clears the timer count section 15, and sets the general area overflow time T2 to the timer count section 15. After that, the CPU 30 executes the program (routine) in the specific area A2. Even in this case, the timer count section 15 still counts the clock signal WDT.

If overflow of the watchdog timer 10 has occurred (if the timer count section 15 has output the overflow signal Sov), the CPU 30 generates an interrupt or the like based on the overflow signal Sov, and performs processing for handling runaway of the running program, such as reset processing.

Figure 6A:
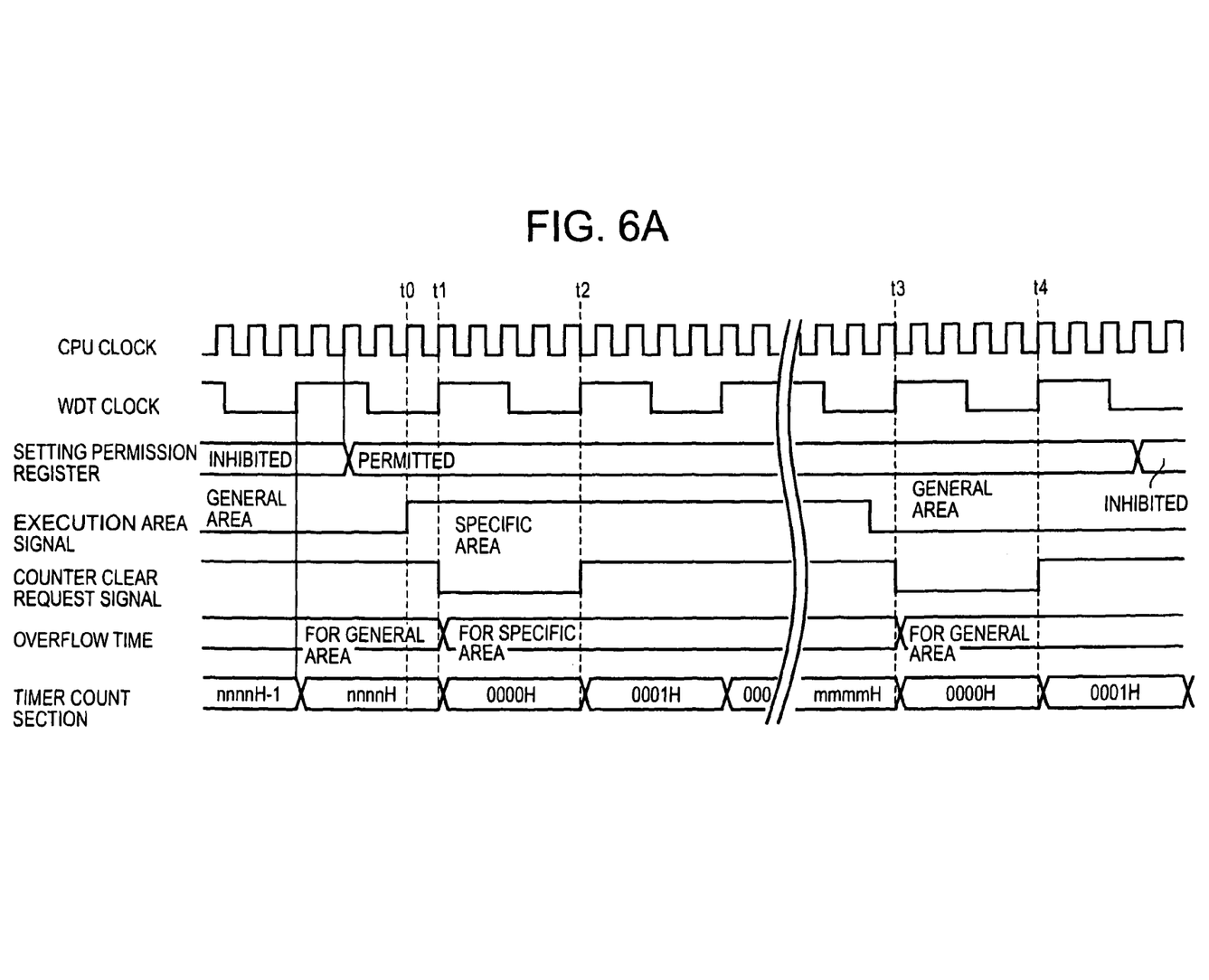
FIGS. 6A and 6B are timing charts each illustrating an operation of the watchdog timer.
Figure 6B:
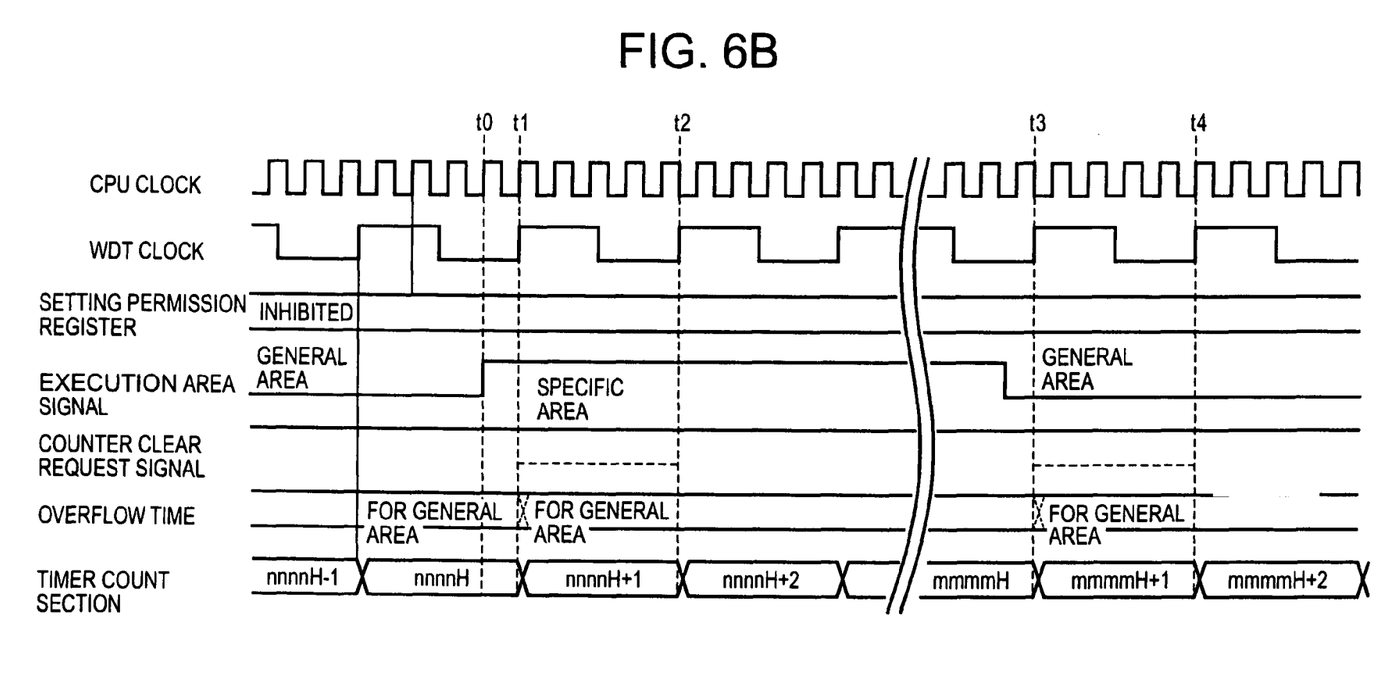

The above-mentioned operation of setting the overflow time of the watchdog timer 10 in the specific area is effective in a case where the setting permission register 11 is set to a permission state. FIGS. 6A and 6B are timing charts each illustrating an operation of the watchdog timer 10.

FIG. 6A illustrates a case where the setting permission register 11 is set to a permission state. It is assumed that in FIG. 6A, the value Pc of the program counter 20 has entered the specific area A1 at a timing t0, that is, the execution area signal Sa has become an active signal (High-level signal). At a timing t1 which is a clock timing next to the timing t0, the counter clear request signal Rc is output as an active signal (Low-level signal) to clear the timer count section 15, and the specific area overflow time T1 is set to the timer count section 15. After that, the timer count section 15 counts up based on the clock signal WDT. Then, the counter clear request signal Rc becomes an inactive signal (High-level signal) at a timing t2 which is a timing of the clock signal WDT next to the timing t1.

It is assumed that the value Pc of the program counter 20 has exited from the specific area A1 immediately before a timing t3, that is, the execution area signal Sa has become an inactive signal (Low-level signal). At the timing t3, the counter clear request signal Rc is output as an active signal (Low-level signal) to clear the timer count section 15, and the general area overflow time T2 is set to the timer count section 15. After that, the timer count section 15 counts up based on the clock signal WDT. Then, the counter clear request signal Rc becomes an inactive signal (High-level signal) at a timing t4 which is a timing of the clock signal WDT next to the timing t3.

FIG. 6B illustrates a case where the setting permission register 11 is set to an inhibition state. It is assumed that in FIG. 6B, the value Pc of the program counter 20 has entered the specific area A1 at the timing t0, that is, the execution area signal Sa has become an active signal (High-level signal). At the timing t1 which is the clock timing next to the timing to, the setting permission signal Sp is an inactive signal (Low-level signal), and hence the counter clear request signal Rc is kept as an inactive signal (High-level signal) without being changed. Accordingly, the general area overflow time T2 is still being set to the timer count section 15. After that, the timer count section 15 counts up based on the clock signal WDT.

It is assumed that the value Pc of the program counter 20 has exited from the specific area A1 immediately before the timing t3, that is, the execution area signal Sa has become an inactive signal (Low-level signal). At the timing t3, the setting permission signal Sp is an inactive signal (Low-level signal), and hence the counter clear request signal Rc is kept as an inactive signal (High-level signal) without being changed. Similarly to the case before the timing t3, the timer count section counts up based on the clock signal WDT.

As described above, by setting the setting permission register 11 to the inhibition state, the overflow time of the timer count section 15 is set as the general area overflow time T2 regardless of whether or not the value Pc of the program counter 20 falls within the specific area A1. With the setting permission register 11 as described above, even in a case where runaway of the running program has occurred, the overflow time is not changed to the specific area overflow time T1 unless the setting permission register 11 is set to the permission state. Accordingly, higher reliability is secured for the routine to be incorporated in association with the specific area A1.

It should be noted that the above-mentioned disclosure of patent document and the like is hereby incorporated by reference into this application. Modifications and adaptations may be made to the first exemplary embodiment or example of the present invention based on the basic technical idea of the present invention within the scope of the entire disclosure (including the appended claims) of the present invention. Further, various combinations and selections may be made to the various disclosed components within the scope of the appended claims of the present invention. Needless to say, the present invention encompasses various modifications and corrections, which could be made by a person skilled in the art based on the entire disclosure including the appended claims and the technical field thereof.

Further, it is noted that, notwithstanding any claim amendments made hereafter, applicant's intent is to encompass equivalents all claim elements, even if amended later during prosecution.

What is claimed is:

1. A watchdog timer, comprising:
a first register that stores a first overflow time;
a second register that stores a second overflow time; and
a counter that continues to count a clock signal to the first overflow time as long as a value of a program counter of a central processing unit (CPU) corresponds to a predetermined address, and that continues to count the clock signal to the second overflow time as long as the value of the program counter does not correspond to the predetermined address; wherein the counter clears a count value when the value of the program counter changes from another address to the predetermined address or changes from the predetermined address to another address; a third register that stores a permission information, wherein, the counter continues to count the clock signal to the second overflow time as long as the permission information indicates an inhibition state and the value of the program counter corresponds to the predetermined address.

2. The watchdog timer according to claim 1, further comprising:
an address detector that compares the value of the program counter with the predetermined address to generate a signal,
wherein the counter counts the clock signal to the first overflow time if the signal has a first level, and counts the clock signal to the second overflow time if the signal has a second level different from the first level.

3. The watchdog timer according to claim 1, further comprising:
a selector that outputs, according to the value of the program counter, one of the first and second overflow times to the counter.

4. The watchdog timer according to claim 1, further comprising:
a counter clear controller that generates a clear signal when the value of the program counter changes from another address to the predetermined address or changes from the predetermined address to another address, wherein the counter clears the count value according to the clear signal.

5. The watchdog timer according to claim 1, further comprising:
a third register that stores a first address;
a fourth register that stores a second address,
wherein
the predetermined address comprises an address range from the first address to the second address and the counter counts the clock signal to the first overflow time if the value of the program counter is inside of the address range.

6. The watchdog timer according to claim 5, further comprising:
an address detector that compares the value of the program counter with the address range, wherein
the counter counts the clock signal to one of the first and second overflow time in response to a comparison result of the address detector.

7. The watchdog timer according to claim 6, wherein the address detector includes:
a first comparator that compares the value of the program counter with the first address; and
a second comparator that compares the value of the program counter with the second address.

8. The watchdog timer according to claim 1, wherein the counter clears a count value according to a clear command output from the CPU.

9. The watchdog timer according to claim 1, further comprising:
a counter clear controller that generates a clear signal when the value of the program counter changes from another address to the predetermined address or changes from the predetermined address to another address or the CPU outputs a clear command, wherein the counter clears the count value according to the clear signal.

10. The watchdog timer according to claim 1, wherein the first overflow time is longer than the second overflow time.

11. A microprocessor, comprising:
the watchdog timer according to claim 1; and
the CPU that is coupled to the watchdog timer.

12. The watchdog timer according to claim 1,
wherein the predetermined address comprises an address range from a first address to a second address, and
wherein the counter counts the clock signal to the first overflow time if the value of the program counter is inside of the address range.

13. The watchdog timer according to claim 12,
wherein the counter counts the clock signal to the second overflow time if the value of the program counter is outside of the address range.

14. A watchdog timer, comprising:
a counter,
wherein said counter:
  continues to count a clock signal to a first overflow time as long as a value of a program counter of a central processing unit (CPU) corresponds to a predetermined address, and
  continues to count the clock signal to a second overflow time as long as the value of the program counter does not correspond to the predetermined address, wherein the counter clears a count value when the value of the program counter changes from another address to the predetermined address or changes from the predetermined address to another address; and an overflow time selection section connected to said counter, wherein said overflow time selection section selects one of said first overflow time and said second overflow time based on an execution area signal and a permission setting signal.

15. The watchdog timer according to claim 14, wherein when said execution area signal and said setting permission signal both comprise an active signal, said overflow time selection section outputs, to said counter, an overflow time signal indicating said first overflow time.

16. The watchdog timer according to claim 14, wherein when at least one of said execution area signal and said setting permission signal comprise other than an active signal, said overflow time selection section outputs, to said counter, an overflow time signal indicating said second overflow time.

17. The watchdog timer according to claim 14, further comprising:
an address matching detection section connected to said overflow time selection section,
wherein said address matching detection section outputs said execution area signal as an active signal when the value of the program counter corresponds to the predetermined address.

* * * * *